(12) United States Patent
Park

(10) Patent No.: US 12,166,523 B2
(45) Date of Patent: Dec. 10, 2024

(54) METHOD AND APPARATUS OF FREQUENCY HOPPING FOR UPLINK TRANSMISSION AND RECEPTION

(71) Applicant: KT CORPORATION, Gyeonggi-do (KR)

(72) Inventor: Ki-Hyeon Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/826,601

(22) Filed: May 27, 2022

(65) Prior Publication Data
US 2022/0393716 A1 Dec. 8, 2022

(30) Foreign Application Priority Data

May 27, 2021 (KR) .................... 10-2021-0068486
May 10, 2022 (KR) .................... 10-2022-0056971

(51) Int. Cl.
*H04W 72/0446* (2023.01)
*H04B 1/713* (2011.01)

(52) U.S. Cl.
CPC .................. *H04B 1/713* (2013.01)

(58) Field of Classification Search
CPC . H04W 72/23; H04W 72/21; H04W 72/0446; H04W 72/0453; H04W 24/10; H04W 72/20; H04W 72/1268; H04W 72/04; H04W 72/12; H04W 72/232; H04B 7/0626; H04B 1/713; H04B 7/0695; H04B 7/0456; H04B 7/024; H04B 7/0617; H04B 7/0639; H04L 5/0053; H04L 5/0048; H04L 5/001; H04L 5/0055; H04L 5/0094; H04L 5/0007; H04L 5/0051; H04L 1/08; H04L 5/0044; H04L 1/1864; H04L 1/1819; H04L 1/0067; H04L 5/00; H04L 1/0041
USPC ......................................... 375/132
See application file for complete search history.

(56) References Cited

U.S. PATENT DOCUMENTS

| 9,615,289 | B2 * | 4/2017 | Park | H04B 1/7143 |
| 2018/0219576 | A1 * | 8/2018 | Bhattad | H04W 72/23 |
| 2019/0036665 | A1 * | 1/2019 | Park | H04L 5/0091 |
| 2020/0366334 | A1 * | 11/2020 | Li | H04L 5/0012 |

(Continued)

FOREIGN PATENT DOCUMENTS

| EP | 3911077 A1 | 11/2021 |
| EP | 4322443 A1 | 2/2024 |

(Continued)

OTHER PUBLICATIONS

European Patent Office, European Search Report of corresponding EP Patent Application No. 22305789.4, Oct. 25, 2022.

(Continued)

*Primary Examiner* — Eva Y Puente
(74) *Attorney, Agent, or Firm* — IP Legal Services, LLC

(57) ABSTRACT

Provided are a method and a device for hopping a frequency to perform uplink transmission. The method may include: receiving frequency hopping configuration information for a transport block transmitted using a plurality of slots; determining a frequency resource location to be hopped in the plurality of slots based on the frequency hopping configuration information; and transmitting the transport block through the plurality of slots according to the frequency resource location.

15 Claims, 13 Drawing Sheets

(56) References Cited

U.S. PATENT DOCUMENTS

| | | | |
|---|---|---|---|
| 2022/0060215 A1 | 2/2022 | Nakamura et al. | |
| 2022/0095353 A1 | 3/2022 | Liu et al. | |
| 2022/0232594 A1* | 7/2022 | Park | H04W 72/20 |
| 2022/0303988 A1* | 9/2022 | Yi | H04L 1/1887 |
| 2022/0330295 A1* | 10/2022 | Ly | H04W 72/0453 |
| 2023/0319813 A1 | 10/2023 | Yao et al. | |

FOREIGN PATENT DOCUMENTS

| | | |
|---|---|---|
| WO | 2020/138004 A1 | 7/2020 |
| WO | 2020/145372 A1 | 7/2020 |
| WO | 2022/154738 A1 | 7/2022 |
| WO | 2022/236685 A1 | 11/2022 |

OTHER PUBLICATIONS

Xiaomi, "Discussion on TB processing over multi-slot PUSCH", R1-2105576, 3GPP TSG RAN WG1 #105-e, e-Meeting, May 10-27, 2021.

Intel Corporation, "Discussion on TB processing over multi-slot PUSCH", R1-2103043, 3GPP TSG RAN WG1 #104b-e, e-Meeting, Apr. 12-20, 2021.

Panasonic, "Discussion on TB processing over multi-slot PUSCH", R1-2103208, 3GPP TSG RAN WG1 #104bis-e, e-Meeting, Apr. 12-20, 2021.

European Patent Office, Office Action of corresponding EP Patent Application No. 22305789.4, Jul. 24, 2024.

\* cited by examiner

METHOD AND APPARATUS OF FREQUENCY HOPPING FOR UPLINK TRANSMISSION AND RECEPTION

CROSS-REFERENCE TO RELATED APPLICATION

This application claims the priority benefit of Korean Patent Application No. 10-2021-0068486, filed on May 27, 2021 and No. 10-2022-0056971, filed on May 10, 2022 in the Korean Intellectual Property Office, the disclosures of which are incorporated herein by reference in their entirety.

BACKGROUND

1. Technical Field

The present disclosure relates to methods and apparatuses of frequency hopping for an uplink transmission and reception in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for new radio (NR). It is required to design NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of NR. In order to meet the requirements of the individual scenarios, it is required to design NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

Accordingly, there is a demand of a design of perform a frequency hopping when a transport block is transmitted using a plurality of slots in the NR.

SUMMARY

In accordance with embodiments of the present disclosure, methods and apparatuses are provided for applying frequency hopping.

In accordance with one aspect of the present disclosure, a method is provided for frequency hopping to perform uplink transmission by a user equipment. The method may include: receiving frequency hopping configuration information for a transport block transmitted using a plurality of slots; determining a frequency resource location to be hopped in the plurality of slots based on the frequency hopping configuration information; and transmitting the transport block through the plurality of slots according to the frequency resource location In accordance with another aspect of the present disclosure, a method is provided for of frequency hopping to perform uplink reception, by a base station. The method may include: transmitting frequency hopping configuration information for a transport block transmitted using a plurality of slots; and receiving the transport block through the plurality of slots according to a determined frequency resource location to be hopped in the plurality of slots based on the frequency hopping configuration information In accordance with still another aspect of the present disclosure, a user equipment is provided for frequency hopping to perform uplink transmission. The user equipment may include: receiver configured to receive frequency hopping configuration information for a transport block transmitted using a plurality of slots; controller configured to determine a frequency resource location to be hopped in the plurality of slots based on the frequency hopping configuration information; and transmitter configured to transmit the transport block through the plurality of slots according to the frequency resource location.

In accordance with further another aspect of the present disclosure, a base station is provided for frequency hopping to perform uplink transmission. The base station may include: transmitter configured to transmit frequency hopping configuration information for a transport block transmitted using a plurality of slots; and receiver configured to receive the transport block through the plurality of slots according to a determined frequency resource location to be hopped in the plurality of slots based on the frequency hopping configuration information.

According to the method and apparatus for frequency hopping in the present disclosure, it is possible to perform frequency hopping while eliminating scheduling rigidity and while transmitting a transport block using a plurality of slots.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
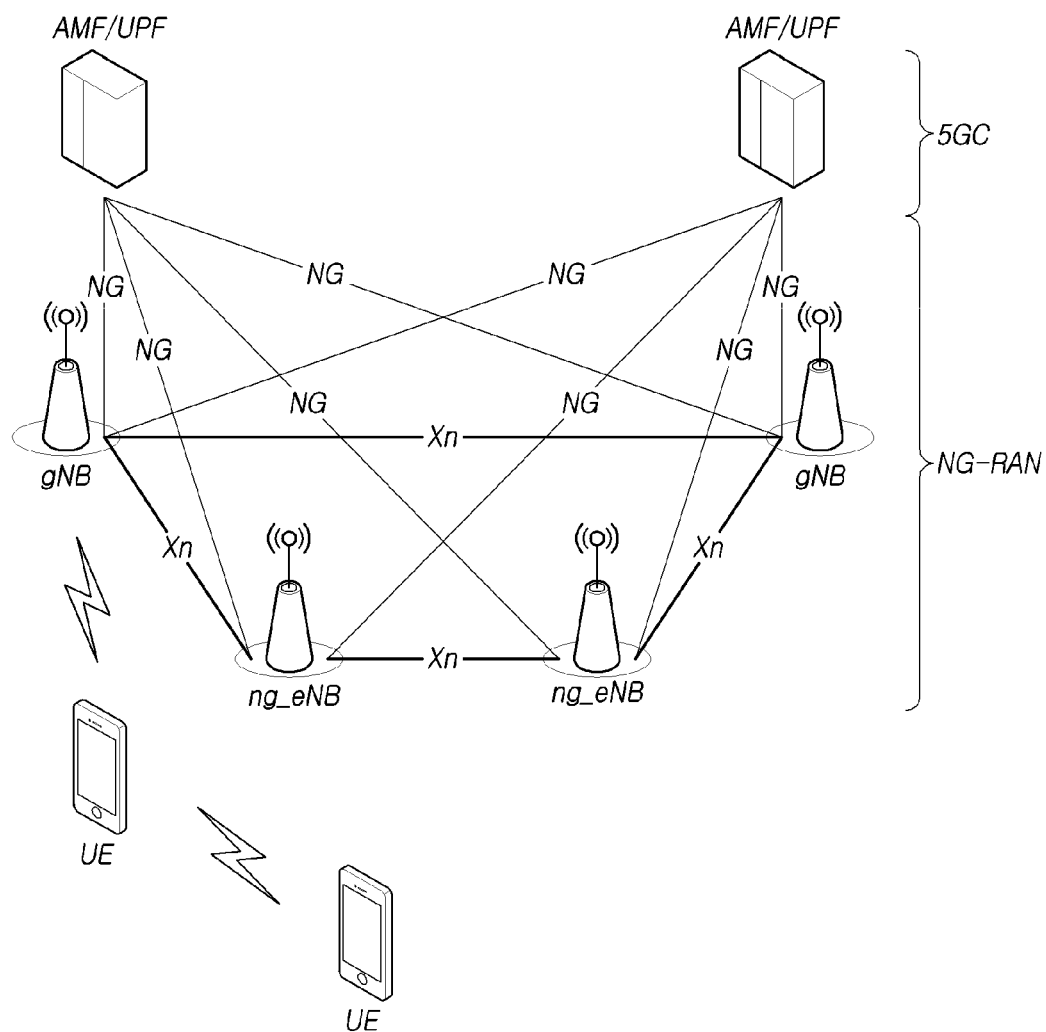
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols.

Figure 2:
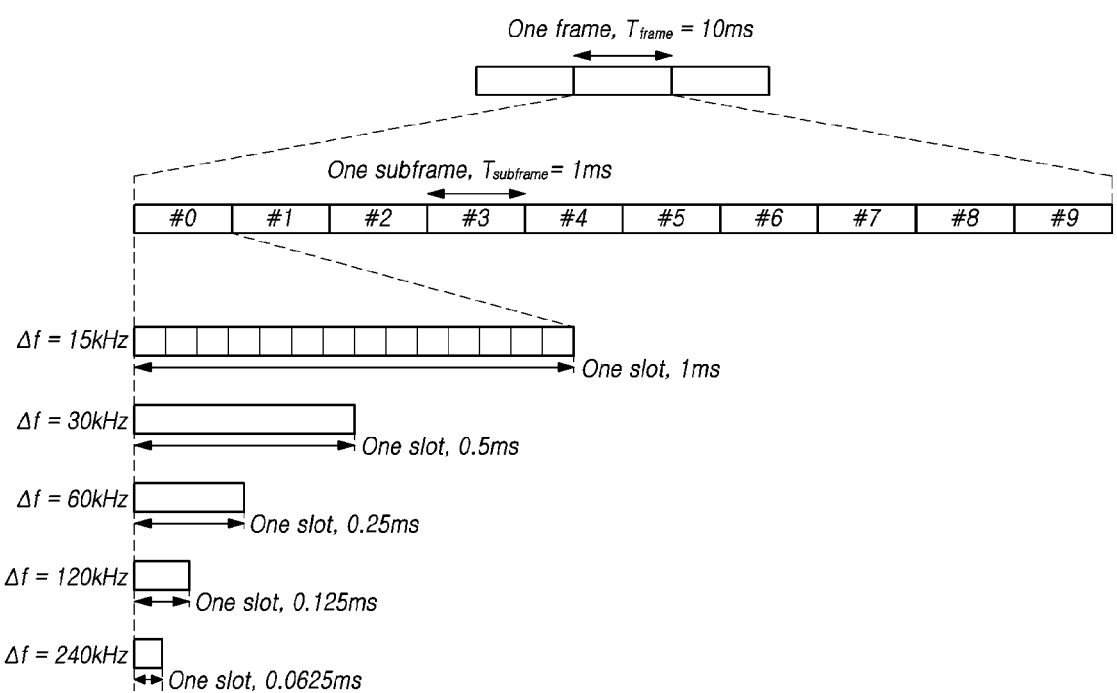
FIG. 2 is a view schematically illustrating a frame structure in an NR system in accordance with embodiments of the present disclosure.

FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
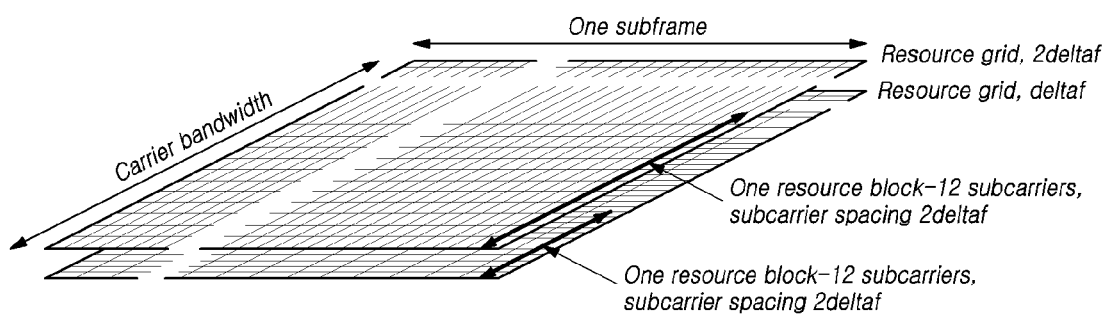
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
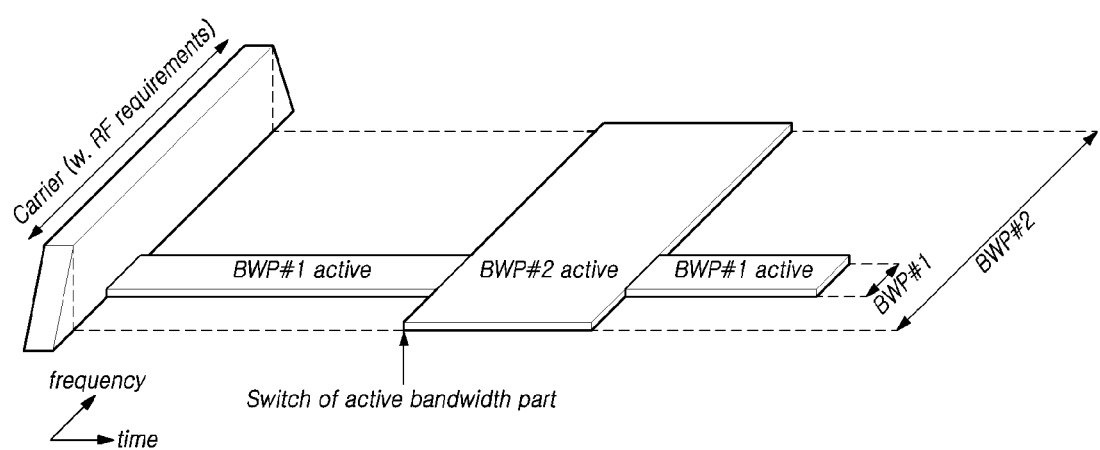
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
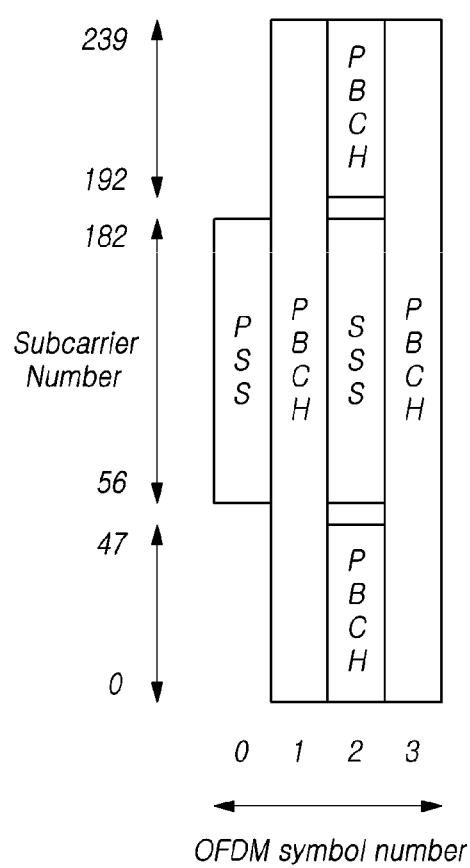
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
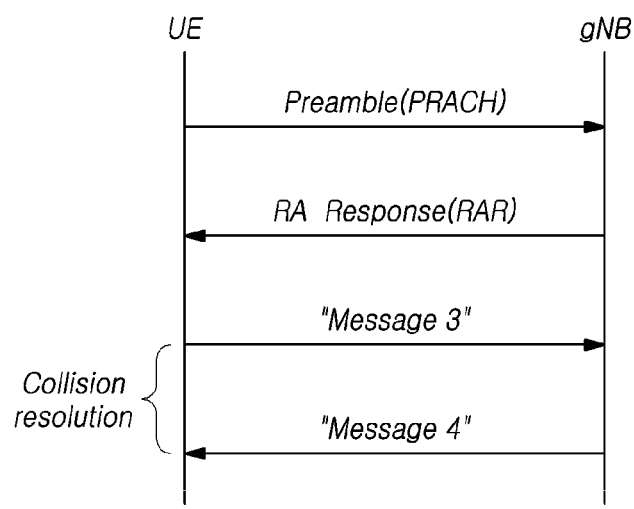
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
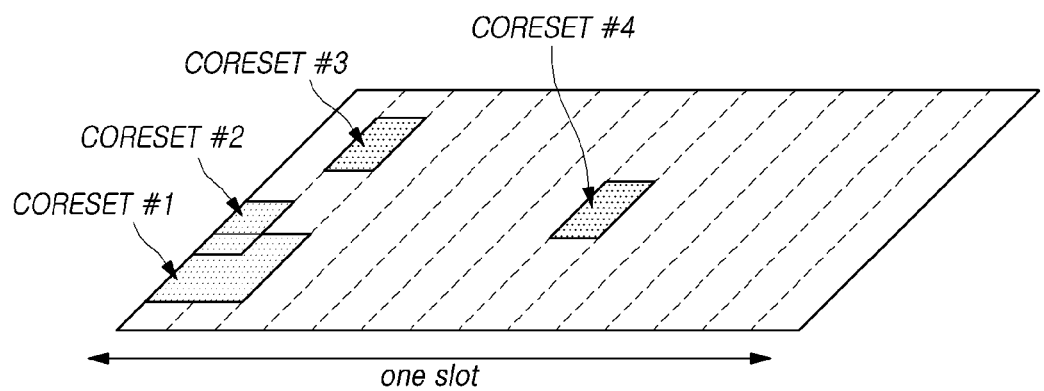
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

In addition, in the present specification, a bandwidth constituted by a certain frequency section within a carrier bandwidth is described as a bandwidth part (BWP), but embodiments are not limited to the term. In addition, a bandwidth composed of a predetermined frequency section within a bandwidth part is described as a subband, but it is not limited to the term.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
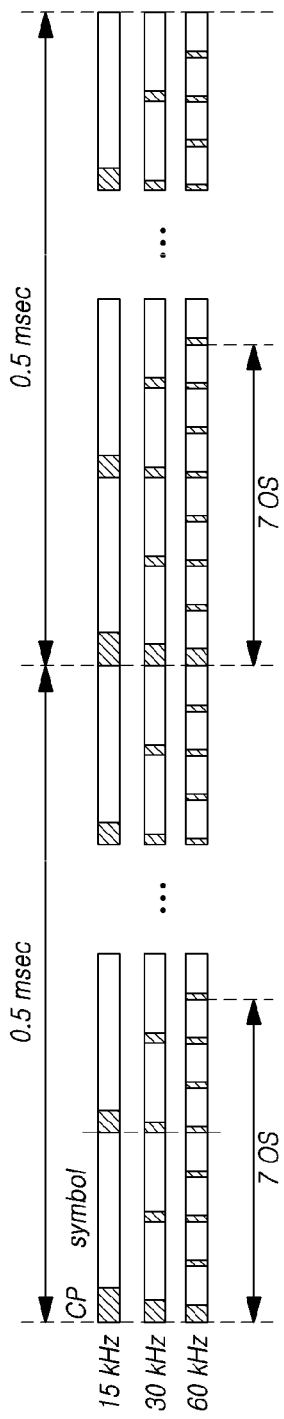
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

Figure 9:
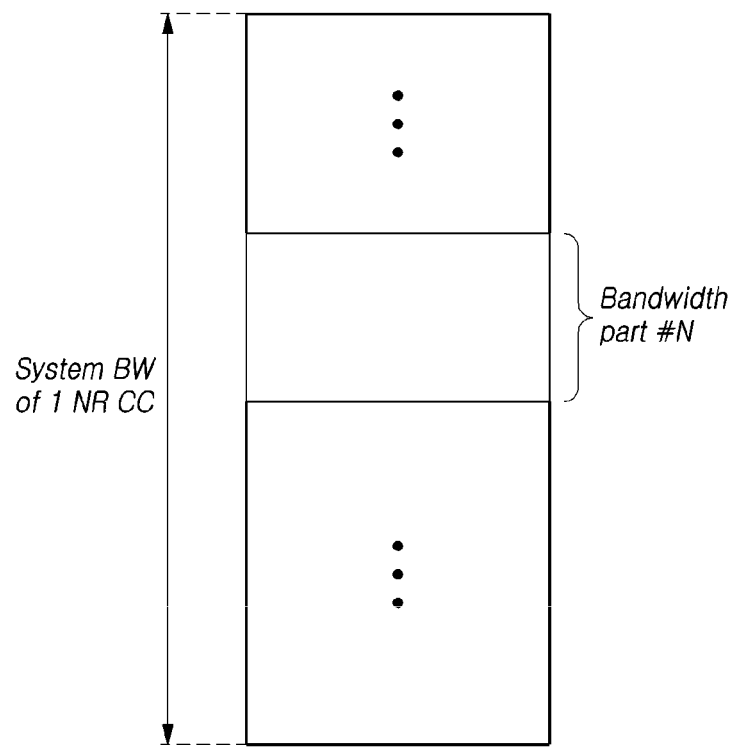
FIG. 9 is a view schematically illustrating a bandwidth part.

However, NR is designed to support NR UE having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in case of configuring a plurality of serving cells for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

Wider Bandwidth Operations

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

However, NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in case of configuring a plurality of serving cells for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

The present disclosure provides a method of configuring a transmission resource for uplink transmission of a coverage enhancement transmission UE in the 3GPP NR system. In particular, there is provided a frequency resource allocation method in which a frequency hopping is supported to suppress quality degradation in a specific band selective channel environment.

In typical 3GPP NR, there is a difference in transmittable area between uplink and downlink. In particular, it is analyzed that the reach range of uplink control and data channel becomes a bottleneck of cell radius. Accordingly, in NR coverage enhancement, there may be considered a method of enabling a PUSCH constituting one transmission block (TB) to be mapped to two or more slots to improve a PUSCH transmission range. As a similar technique, PUSCH repetition was introduced. The PUSCH repetition is divided into PUSCH repetition Type A and Type B.

The PUSCH repetition Type A repeatedly transmits the same TB in the same time (symbol) and frequency (RB) domain of a logically connected slot for a transport block (TB) configured in a specific slot/frequency unit, and different redundancy versions (Redundancy version) is supported. The PUSCH Repetition Type B is a method that supports different symbol lengths for every slot, compared to the PUSCH Repetition Type A using only the same symbol length in all repetition slots.

The TB over multi-slot (TBoMS), which is handled in the NR coverage enhancement, is a transmission type that one TB spans different RB areas and at the same time spans different slot areas at the same time. That is, rather than repeatedly transmitting the TB having a size is completed in one slot, the TB size is determined based on resources allocated over several slots, and the code rate and redundancy version are managed based on this. Related operations including configuration of the TB size have not been decided. For example, if the configured TB code rate is sufficiently low, it may operate in a form similar to that of the PUSCH repetition, such as decoding succeeds before receiving all slots. Any actions such as the form of supporting feedback have not been decided.

In order to support the PUSCH repetition technology, a standard and specification for frequency hopping may be defined. The technology defines an offset value or a set of values in advance as radio resource control (RRC) for intra-slot hopping and inter-slot hopping, respectively. In this case, an offset value may be indicated by a flag indicating whether to use the uplink PUSCH scheduling and/or some bits of frequency resource configuration bits.

In case of the intra-slot hopping, the UE calculate the position of the transport block to be hopped by maintaining a RB location of a first half symbol of a slot at the originally configured location and converting the originally configured start RB location for a latter half symbol of the slot to a hopped start RB location by adding an indicated offset to the originally configured start RB location for the latter half symbol.

In case of the inter-slot hopping, the UE may perform the above operations into odd-numbered slots and even-numbered slots among the plurality of slots, respectively.

In case of the previously defined hopping, the previously indicated frequency resource location is designed so that it does not exceed the configured BWP size when the start RB index and the length L are added. However, when the start RB and the length L are added to the hopping location calculated through this, it is theoretically possible to indicate that it exceeds the set BWP size. The current standard is dictated in the form that the configured BWP size before and after the frequency hopping should not exceed the previously configured BWP size so that the corresponding situation does give rigidity to the uplink PUSCH scheduling. For example, when the offset is indicated as half the size of the BWP, it is impossible to allocate the transport block having a size greater than half of the BWP at all.

In addition, unlike the typical PUSCH repetition structure, the TB over multi-slot (TBoMS) may be allocated for non-consecutive slots. In case of allocating consecutive slots, the same type of the frequency hopping as the typical PUSCH repetition structure may be used, but there is needed a definition of frequency allocation for non-consecutive slots.

The present disclosure introduces a frequency hopping method capable of overcoming such scheduling rigidity. In addition, the present disclosure provides a frequency domain configuration method capable of overcoming frequency band fading in the TBoMS transmission. In particular, the present disclosure provides a method capable of performing the frequency hopping when indicated by a set of non-consecutive slots.

Hereinafter, a method of frequency hopping for uplink transmission and reception will be described in detail with reference to the accompanying drawings.

Figure 10:
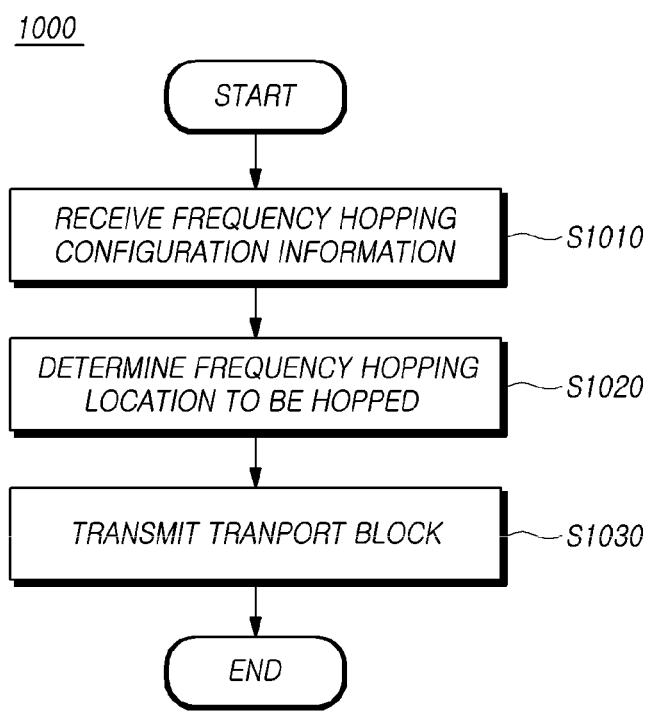
FIG. 10 is a flowchart illustrating a procedure for performing frequency hopping for uplink transmission by a UE according to an embodiment.

FIG. 10 is a flowchart illustrating a method for frequency hopping for uplink transmission by a UE according to an embodiment.

Referring to FIG. 10, according to a method 1000 for frequency hopping for uplink transmission by a UE according to an embodiment the UE may include receiving frequency hopping configuration information for a transport block transmitted using a plurality of slots at S1010.

The transport block may be the transport block over multi-slot (TBoMS) to be transmitted by using a plurality of slots. In this case, the transport block may be configured such that the number of coded bits applied to each slot constituting the plurality of slots is the same as the number of coded bits when transmitted using a single slot.

A plurality of slots for transmitting a transport block may be configured with consecutive or non-consecutive slots. In this way, the UE may receive the frequency hopping configuration information defined separately for a case in which one transport block is transmitted over a plurality of slots from the base station.

For example, the frequency hopping configuration information includes information on whether or not the frequency hopping is applied and frequency hopping offset information. The frequency hopping configuration information may be received by higher layer signaling such as radio recourse control (RRC) signaling. In addition, the frequency hopping configuration information may further include information on whether or not the frequency hopping for repeated transmission is applied, frequency hopping related information for the transport block to be transmitted using the plurality of slots, inter-slot frequency hopping related information, and the like. In this case, the frequency hopping related information for the transport block to be transmitted using the plurality of slots may include information on a slot location to which the frequency hopping may be applied or frequency hopping offset values.

Referring back to FIG. 10, the UE may determine a frequency resource location to be hopped in the plurality of slots based on the frequency hopping configuration information at S1020.

As described above, configurations related to the frequency hopping for the transport block to be transmitted using the plurality of slots by the high layer signaling may be configured in advance. Thereafter, the UE may receive downlink control information (DCI) indicating whether to apply the frequency hopping and the frequency hopping offset from the base station. For example, a separate field for indicating the frequency hopping for the transport block to be transmitted using the plurality of slots may be further contained in the DCI. Alternatively, the DCI of a new format for the corresponding transport block may be newly defined.

The UE may determine the location of a frequency resource for the plurality of slots for transmitting the transport block based on the preconfigured frequency hopping configuration information according to information indicated by the DCI.

According to an embodiment, with respect to the plurality of slots allocated for transmitting one transport block, when the slots are consecutive, whether to apply the frequency hopping may be indicated based on the slot number in the radio frame of the allocated slot. Alternatively, odd-numbered or even-numbered slots within the plurality of slots allocated for the corresponding transport block may be indicated as the frequency hopping locations. Alternatively, when the plurality of slots allocated for transmission of one transport block are non-consecutive, a frequency hopping location or an offset value determined together when configuring the set of the plurality of slots may be indicated. Alternatively, all slots may be divided into the front and the rear halves, so that one of the entire front half and second half may be indicated as the frequency hopping location.

According to another embodiment, when repeated transmission or repetition for the transport block is configured, the frequency hopping may be applied based on a slot unit in which the repeated transmission is configured. That is, when both TBoMS and repeated transmission are applied, the UE may determine the location of the frequency hopped frequency resource in units of slots to be repeatedly transmitted. In other words, the frequency hopping may be applied based on the configured slot unit in which repeated transmission is configured when the repeated transmission is configured for the transport block. For example, the UE may determine the location of the frequency resource so that the frequency hopping is applied only to one of a plurality of slots in which the corresponding transport block is initially transmitted or the plurality of slots in which the corresponding transport block is repeatedly transmitted.

According to an embodiment, the frequency hopping may be applied based on a bandwidth part (BWP) configured for the UE or a plurality of subbands constituting the bandwidth part. For example, the frequency hopping configuration information may include frequency hopping information based on the bandwidth part configured in the UE.

For example, the frequency hopping configuration information may include information configuring a plurality of sub-BWPs within the bandwidth part. In this case, when the UE receives the index information for the sub-BWP through the DCI, it may determine the frequency resource location to be hoped in the corresponding sub-BWP. Alternatively, the UE may determine the frequency resource location to be hoped for the sub-BWP corresponding to a frequency resource allocated for the corresponding transport block.

Alternatively, the frequency hopping configuration information may include configuration information for the plurality of subbands constituting the bandwidth part. That is, a plurality of consecutive and non-overlapping subbands constituting the bandwidth part may be configured. In this case, the UE may determine a frequency resource location to be hoped for the subband corresponding to a frequency resource allocated for the corresponding transport block.

Referring back to FIG. 10, the UE may transmit the transport block through the plurality of slots according to the frequency resource location at S1030.

After determining the location of the frequency resource to be hopped, the UE may transmit the transport block to which the frequency hopping is applied at the location to the base station through an uplink control channel or an uplink data channel.

According to the frequency hopping method described above, it is possible to eliminate scheduling rigidity and transmitting a transport block using the plurality of slots.

Hereinafter, operations of the base station, related to the above-described UE operations, will be described with reference to the accompanying drawings.

Figure 11:
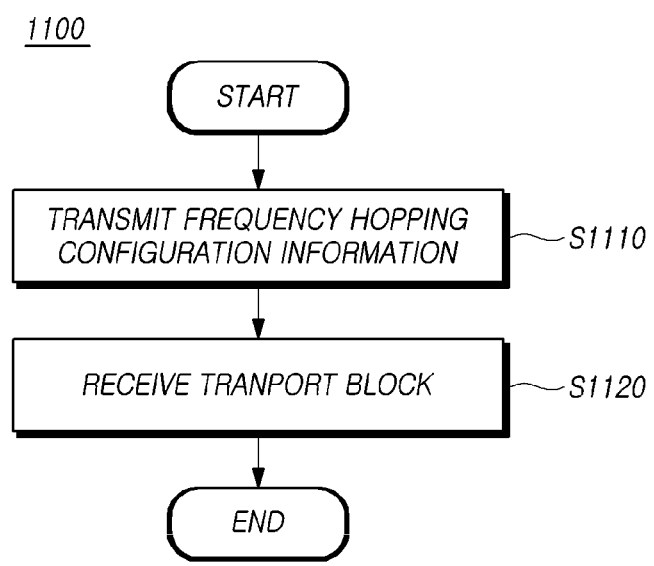
FIG. 11 is a flowchart illustrating a procedure for performing frequency hopping for uplink reception by a base station according to an embodiment.

FIG. 11 is a flowchart illustrating a method for frequency hopping for uplink reception by a base station according to an embodiment.

Referring to FIG. 11, according to a method 1100 for performing the frequency hopping for uplink reception by a base station according to an embodiment, the base station may transmit frequency hopping configuration information for a transport block transmitted using a plurality of slots at S1110.

The transport block may be the transport block over multi-slot (TBoMS) to be transmitted by using a plurality of slots. In this case, the transport block may be configured such that the number of coded bits applied to each slot constituting the plurality of slots is the same as the number of coded bits when transmitted using a single slot.

A plurality of slots for transmitting a transport block may be configured with consecutive or non-consecutive slots. In this way, the base station may transmit the frequency hopping configuration information defined separately for a case in which one transport block is transmitted over a plurality of slots from the base station.

For example, the frequency hopping configuration information includes information on whether or not the frequency hopping is applied and frequency hopping offset information. The frequency hopping configuration information may be received by higher layer signaling such as RRC signaling. In addition, the frequency hopping configuration information may further include information on whether or not the frequency hopping for the repeated transmission is applied, frequency hopping related information for the transport block to be transmitted using the plurality of slots, inter-slot frequency hopping related information, and the like. In this case, the frequency hopping related information for the transport block to be transmitted using the plurality of slots may include information on a slot location to which the frequency hopping may be applied or frequency hopping offset values.

Referring back to FIG. 11, the base station may receive the transport block through the plurality of slots according to a determined frequency resource location to be hopped in the plurality of slots based on the frequency hopping configuration information at S1120.

As described above, configurations related to the frequency hopping for the transport block to be transmitted using the plurality of slots by the high layer signaling may be configured in advance. Thereafter, the base station may transmit a downlink control information (DCI) indicating whether to apply the frequency hopping and the frequency hopping offset from the base station. For example, a separate field for indicating the frequency hopping for the transport block to be transmitted using the plurality of slots may be further contained in the DCI. Alternatively, the DCI of a new format for the corresponding transport block may be newly defined.

The UE may determine the location of a frequency resource for the plurality of slots for transmitting the transport block based on the preconfigured frequency hopping configuration information according to information indicated by the DCI.

According to an embodiment, with respect to the plurality of slots allocated for transmission of one transport block, when the slots are consecutive, whether to apply the frequency hopping may be indicated based on the slot number in the radio frame of the allocated slot. Alternatively, odd-numbered or even-numbered slots within the plurality of slots allocated for the corresponding transport block may be indicated as the frequency hopping locations. Alternatively, when the plurality of slots allocated for transmission of one transport block are non-consecutive, a frequency hopping location or an offset value determined together when configuring the set of the plurality of slots may be indicated. Alternatively, all slots may be divided into the front half and the rear half (e.g., first half and second half), so that one of the entire front half and rear half may be indicated as the frequency hopping location.

According to another embodiment, when the repeated transmission or the repetition for the transport block is configured, the frequency hopping may be applied based on a slot unit in which the repeated transmission is configured. That is, when both TBoMS and the repeated transmission are applied, the UE may determine the location of the frequency hopped frequency resource in units of slots to be repeatedly transmitted. In other words, the frequency hopping may be applied based on the configured slot unit in which the repeated transmission is configured when the repeated transmission is configured for the transport block. For example, the UE may determine the location of the frequency resource so that the frequency hopping is applied only to one of a plurality of slots in which the corresponding transport block is initially transmitted or the plurality of slots in which the corresponding transport block is repeatedly transmitted.

According to an embodiment, the frequency hopping may be applied based on a bandwidth part (BWP) configured for the UE or a plurality of subbands constituting the bandwidth part. For example, the frequency hopping configuration information may include frequency hopping information based on the bandwidth part configured in the UE.

For example, the frequency hopping configuration information may include information configuring a plurality of sub-BWPs within the bandwidth part. In this case, when the base station transmits the index information for the sub-BWP through the DCI, it may determine the frequency resource location to be hoped in the corresponding sub-BWP. Alternatively, the UE may determine the frequency resource location to be hoped for the sub-BWP corresponding to a frequency resource allocated for the corresponding transport block.

Alternatively, the frequency hopping configuration information may include configuration information for the plurality of subbands constituting the bandwidth part. That is, a plurality of consecutive and non-overlapping subbands constituting the bandwidth part may be configured. In this case, the UE may determine a frequency resource location to be hoped for the subband corresponding to a frequency resource allocated for the corresponding transport block.

The base station may receive the transport block through the plurality of slots according to the frequency resource location. After determining the location of the frequency resource to be hopped, the base station may receive the transport block to which the frequency hopping is applied at the location from the UE through an uplink control channel or an uplink data channel.

According to the frequency hopping embodiments described above, it is possible to perform the frequency hopping while eliminating scheduling rigidity and for transmitting a transport block using the plurality of slots.

As mentioned above, the present disclosure provides a method of configuring a transmission resource for uplink transmission of a coverage enhancement transmission UE in the 3GPP NR system. In particular, there is provided a frequency resource allocation method in which a frequency hopping is supported to suppress quality degradation in a specific band selective channel environment.

To this end, the present disclosure provides (1) a symmetric-based frequency hopping and indication method, (2) a frequency hopping and indication method in PUSCH TBoMS, and (3) a method for determining a band range for the frequency hopping through the embodiments. The embodiments described below may apply individually or in any combination.

Embodiment 1. Symmetric-Based Frequency Hopping and Indication Method

This embodiment is a method of designating a frequency allocation location in a symbol/slot to be hopped as a symmetric location in BWP, not the offset of the original location.

① Hopped Frequency Resource Location Determination Method

A new start RB index value RB_H to be hopped using the symmetric-based frequency hopping may be calculated as below. Here, RB_S is a previously indicated start resource block index value, L is a length, RB_BS is a first RB index of the entire BWP, and RB_BE indicates a last RB index, $$RB\_H = RB\_BE + RB\_BS - (RB\_S + L)$$

For example, when an uplink frequency resource has a start symbol 10 and a length of 10 and an uplink BWP has a total size of 100 RB and consists of s 0 to 99 RB, the hopped start symbol RB_H may be calculated as below.

$$RB\_H = 99 + 0 - (10 + 10) = 79$$

That is, in this case, the new start RB index becomes 79. Since the length is 10, the hoped resources are allocated to the 79$^{th}$ to 89$^{th}$ RBs.

When the RB_S is expressed as a location relative to the index of the BWP starting point, the RB_H may be calculated using the BWP size N_BWP. In this case, RB_H may be calculated as follows.

$$RB\_H = N\_BWP - 1 - (RB\_S + L)$$

② Symmetric-Based Frequency Hopping Indication Method

The typical frequencyHoppingOffset is indicated by the RRC, and some of the values configured in the typical frequencyHoppingOffset may be indicated as the symmetric-based frequency hopping.

For example, when the indicated offset is equal to 0 or the BWP size, the UE may recognize such offset as the symmetric-based frequency hopping. Alternatively, when indicating a hopping method through a message indicating hopping related information, such as frequencyHoppingDCI-x_x, a predetermined form of symmetric-based frequency indication may be added to the format instead of using the offset value for indication. Alternatively, when the frequency hopping is configured but the offset value is not configured in the RRC, such a configuration in the RRC may be recognized as symmetric-based frequency hopping.

Embodiment 2. Frequency Hopping and Indication Method in PUSCH TBoMS

This embodiment is a method for performing the PUSCH frequency hopping for the transport block indicated over two or more slots and a method for indicating the same. In particular, there are provided a method for performing the PUSCH frequency hopping on slots defined physically/logically non-contiguously from a time point of view and a method for indicating the same, unlike the existing PUSCH repetition.

① Frequency Hopping Method Between Non-Consecutive Slots

The method is a frequency hopping method for the transport block allocated to a non-contiguous set of slots. To this end, as in the case of consecutive slots, whether to perform the frequency hopping may be determined depending on the number in the radio frame of the allocated slot. In addition, an odd-numbered or even-numbered slot in the corresponding configured transport block set may be configured as a hopping location. Alternatively, when configuring a non-consecutive slot set or a set of non-consecutive slots, a hopping location and/or an offset value may be configured together. Alternatively, the entire slots may be divided into first/second halves to set the entire first half or the entire second half as the hopping location.

In addition, when both TBoMS and the repetition are applied, the frequency hopping may be performed in units of multi-slots to be replicated. For example, it is assumed that the TBoMS allocated over two slots 1 and 2 is repeated twice. In this case, the transport blocks of the slots 1 and 2 are repeated in the slots 3 and 4. In this case, it may be configured that the frequency hopping is performed in the slots 3 and 4 and the frequency hopping is not performed in the slots 1 and 2.

② Frequency Hopping Indication Method in PUSCH TBoMS

This is a method of indicating whether to perform the frequency hopping to the UE allocated with the TBoMS resources. To this end, in the RRC, the hopping status and offset newly configured for the TBoMS may be used in advance, or the configuration used for the repetition may be followed as it is. For example, even when the repetition and the TBoMS are indicated at the same time, the frequency hopping may be performed on an odd-numbered radio frame number according to the typical repetition configuration, or the frequency hopping may be performed at a location where the second repetition is performed according to the TBoMS configuration.

Whether to perform the frequency hopping may use the typical indication message in the DCI format such as DCI formats 0_0, 0_1 as it is, or a new field defined for the TBoMS may be applied. For example, when a hopping pattern and the non-contiguous slot set of the TBoMS and defined together, the UE may perform the frequency hopping while ignoring a hopping flag or an offset value of the corresponding DCI.

Embodiment 3. Method for Determining Band Range for Frequency Hopping

TBoMS is a technology that may allocate a subband proper to the UE in a specific frequency selective environment. Therefore, when the channel quality information for each band is known, the frequency hopping operating in the entire BWP may be inefficient. To this end, the base station may additionally indicate the hopping range, and when the UE determines the frequency hopping location, it is calculated based on the indicated location, not the BWP. It may be divided into a method of additionally indicating sub-BWP for each UE and a method of dividing the BWP into subbands.

① How to Configure Sub-BWP

This is a method of configuring and delivering a subband-type band of a band additionally composed of the BWP to the UE. After grouping in the RRC in advance, it may be determined in a form dependent on the index of the group or the indicated resource location in the DCI. Alternatively, the DCI may be directly indicated. For this purpose, above or below the indicated frequency range, a specific range that may be proportional to the indicated width may be configured as the indicated sub-BWP.

In addition, with respect to whether the frequency hopping is applied based on the entire BWP or the sub-BWP, the base station may indicate the additional flag within the message to transmit the frequency hopping information such as frequencyHoppingDCI-x_x of the RRC or the DCI.

② How to Divide BWP into Subbands

This is a method of configuring the subband to which the band used by the UE belongs as a sub-BWP after dividing the BWP into a specific number of subbands in advance or implicitly by the RRC.

For example, a BWP composed of an RB index of 0 to 99 may be composed of five subbands of RBs 0 to 19, 20 to 39, 40 to 59, 60 to 79, and 80 to 99. In this case, the frequency hopping may be performed only in the RBs 20 to 39 for the transport blocks transmitted through RBs 20 to 24. The size of the subband may be explicitly specified as the RRC in advance. Alternatively, the size of the subband may be equally divided into integer values that are standardly determined or transmitted through the RRC. Alternatively, the size of the subbands may be configured to have a specific size, so that the number varies according to the BWP size.

Embodiment 4. BWP Hopping

For a UE, the base station may configure/indicate whether to perform the frequency hopping in BWP unit separately from the frequency hopping in the BWP. The UE for which the BWP hopping is configured/indicated in this way may perform intra-slot or inter-slot BWP hopping.

According to an embodiment, the corresponding BWP itself may be hopped for each BWP configured for a UE. That is, the frequency location of the corresponding BWP is hopped. That is, although the BWP ID configured by the base station is maintained, the frequency domain of the corresponding BWP may be applied in the form of the frequency hopping within the system bandwidth.

For example, when the BWP hopping is applied in a state where four BWPs of BWP #0, #1, #2, and #3 are configured for a UE, the frequency location of each BWP may be hopped as much as the RB offset value configured for the BWP hopping.

To express this case as an equation, RB_start_BWP#0 is the starting RB, which is a resource block from which BWP #0 starts in the system bandwidth, and RB_offset_BWP_hopping denotes the RB offset value configured for the BWP hopping is called. In this case, if the intra-slot BWP hopping is applied to BWP #0, the frequency location of the corresponding BWP #0 may be defined as follows.

In detail, the starting RB of the first hop (first frequency hop) of BWP #0 may be defined by the following equation.
starting RB=RB_start_BWP#0
The starting RB of the second hop (second frequency hop) of BWP #0 may be defined by the following equation.
starting RB=(RB_start_BWP#0+RB_offset_BWP_hopping) mod N_systemBW
Here, N_systemBW is the system bandwidth of the component carrier.

The corresponding BWP hopping configuration may be configured through the high layer signaling. For example, the corresponding BWP hopping configuration may be configured through the typical RRC signaling, for example, BWP configuration information, or may be configured via separate RRC signaling. In addition, one or more RB offset information for the corresponding BWP hopping may be configured through the BWP hopping configuration information. Additionally, the corresponding BWP hopping and RB offset values may be indicated through the DCI.

According to another embodiment, when configuring any BWP, it may be configured in the form of a bandwidth part pair (BWP pair) for applying the BWP hopping. That is, for BWP #0, the first pair of BWP #0 and the second pair of BWP #0 having different frequency locations are configured, and the BWP is also formed in the form of a BWP pair for BWP #1, #2, and #3, respectively. Accordingly, when the BWP hopping is configured/indicated while any BWP is activated, the corresponding UE performs the frequency hopping between the BWP pairs of the same BWP ID when applying the intra-slot or inter-slot BWP hopping. That is, if the BWP hopping is applied while any BWP #0 is activated, there is performed the frequency hopping from the first pair of BWP #0 to the second pair of BWP #0 or conversely from the second pair to the first pair can be made.

According to another embodiment, the corresponding BWP hopping may be applied in the form of the frequency hopping between BWP IDs set for a UE. That is, when four BWP #0, #1, #2, #3 are configured in a UE and when the BWP hopping is applied while BWP #0 is activated, the frequency hopping is performed from BWP #0 to BWP #1. In addition, it may be configured to perform the frequency hopping in the order of BWP #2 and BWP #3. Alternatively, the base station may configures/indicate a bandwidth part index offset. Based on this, the frequency hopping may be configured from the current BWP ID to the BWP corresponding to the BWP ID+BWP index offset.

Embodiment 5. System Bandwidth Based Frequency Hopping

In addition to the frequency hopping in the typical BWP, the frequency hopping in units of system bandwidth may be applied.

In this case, the base station may be configured through higher layer signaling or indicate through physical control signaling as to whether to apply the typical frequency hopping of the BWP unit or the frequency hopping of the system bandwidth unit to a UE. In addition, it is possible to configure an RB offset value for the frequency hopping in unit of system bandwidth separately from the RB offset value for the frequency hopping based on the BWP.

When the system bandwidth-based frequency hopping is defined in this way, the base station may configure or indicate whether to apply the typical BWP-based frequency hopping or the system bandwidth-based frequency hopping to a UE.

Additionally, when the above-described BWP hopping or system bandwidth-based frequency hopping is applied, it may be necessary to secure a transition time for radio frequency returning (RF retuning) in the corresponding UE. In this case, the corresponding transition time may be configured to be secured through the last symbol(s) of the first frequency hop or secured through the first symbol(s) of the second hop.

In the above, for convenience of description, only the frequency hopping for the PUSCH has been described, but it is not limited thereto. The embodiments described in the present disclosure may be substantially identically applied to the PUCCH, other control channel, other data channel or any signal.

According to the methods provided in the present disclosure, the frequency hopping may be performed with scheduling rigidity eliminated. In particular, the frequency hopping may be performed while exhibiting the performance of the transport block over multi-slot.

Hereinafter, configurations of the UE capable of performing some or all of the embodiments described with reference to FIGS. 1 to 11 will be described with reference to the drawings. The above description may be omitted to avoid redundant description, and in this case, the omitted content may be substantially identically applied to the following description unless it goes against the technical spirit of the present invention.

Figure 12:
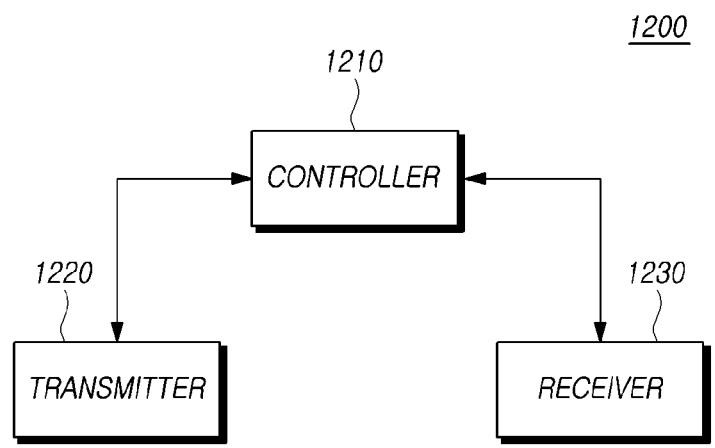
FIG. 12 is a block diagram illustrating a UE according to an embodiment.

FIG. 12 is a block diagram illustrating a UE 1200 according to an embodiment.

Referring to FIG. 12, a UE 1200 includes a controller 1210, a transmitter 1220, and a receiver 1230.

The controller 1210 controls the overall operation of the UE 1200 according to the method of hopping a frequency to perform uplink transmission needed to perform the above-described disclosure. The transmitter 1220 transmits uplink control information and data or messages to the base station via a corresponding channel. The receiver 1230 receives downlink control information and data or messages from the base station via a corresponding channel.

The receiver 1230 may be configured to receive frequency hopping configuration information for a transport block transmitted using a plurality of slots. The transport block may be the transport block over multi-slot (TBoMS) to be transmitted by using a plurality of slots. For the transport block, the number of coded bits applied to each slot is be same as the number of coded bits when transmitted using a single slot.

A plurality of slots for transmitting a transport block may be configured with consecutive or non-consecutive slots. In this way, the UE may receive, from the base station, the frequency hopping configuration information defined separately for a transport block transmitted over a plurality of slots.

For example, the frequency hopping configuration information includes information on whether or not the frequency hopping is applied and frequency hopping offset information, and the frequency hopping configuration information may be received by higher layer signaling such as RRC signaling. In addition, the frequency hopping configuration information may further include information on whether or not the frequency hopping for the repeated transmission is applied, frequency hopping related information for the transport block to be transmitted using the plurality of slots, inter-slot frequency hopping related information, and the like. In this case, the frequency hopping related information for the transport block to be transmitted using the plurality of slots may include information on a slot location to which the frequency hopping may be applied or frequency hopping offset values.

The controller 1210 may be configured to determine a frequency resource location to be hopped in the plurality of slots based on the frequency hopping configuration information.

As described above, configurations related to the frequency hopping for the transport block to be transmitted using the plurality of slots by the high layer signaling may be configured in advance. Thereafter, the receiver 1230 may receive a downlink control information (DCI) indicating whether to apply the frequency hopping and the frequency hopping offset from the base station. For example, a separate field for indicating the frequency hopping for the transport block to be transmitted using the plurality of slots may be further contained in the DCI. Alternatively, the DCI of a new format for the corresponding transport block may be newly defined.

The controller 1210 may determine the location of a frequency resource for the plurality of slots in which the transport block is transmitted based on the preconfigured frequency hopping configuration information according to information indicated by the DCI.

According to an embodiment, with respect to the plurality of slots allocated for transmission of one transport block, when the slots are consecutive, whether to apply the frequency hopping may be indicated based on the slot number in the radio frame of the allocated slot. Alternatively, odd-numbered or even-numbered slots within the plurality of slots allocated for the corresponding transport block may be indicated as the frequency hopping locations. Alternatively, when the plurality of slots allocated for transmission of one transport block are non-consecutive, a frequency hopping location or an offset value determined together when configuring the set of the plurality of slots may be indicated. Alternatively, all slots may be divided into the front half and the rear half (e.g., first half and second half), so that one of the entire front half and second half may be indicated as the frequency hopping location.

According to another embodiment, when the repeated transmission or repetition for the transport block is configured, the frequency hopping may be applied based on a slot unit configured for the repeated transmission. That is, when both TBoMS and the repeated transmission are applied, the controller 1210 may determine the location of the frequency hopped frequency resource in units of slots to be repeatedly transmitted. In other words, the frequency hopping may be applied based on the configured slot unit configured for the repeated transmission when the repeated transmission is configured for the transport block. For example, the UE may determine the location of the frequency resource so that the frequency hopping is applied only to one of a plurality of slots in which the corresponding transport block is initially transmitted or the plurality of slots in which the corresponding transport block is repeatedly transmitted.

According to an embodiment, the frequency hopping may be applied based on a bandwidth part (BWP) configured for the UE 1200 or a plurality of subbands constituting the bandwidth part. For example, the frequency hopping configuration information may include frequency hopping information based on the bandwidth part configured in the UE.

For example, the frequency hopping configuration information may include information configuring a plurality of sub-BWPs within the bandwidth part. In this case, when the UE receives the index information for the sub-BWP through the DCI, the controller 1210 may determine the frequency resource location to be hoped in the corresponding sub-BWP. Alternatively, the controller 1210 may determine the frequency resource location to be hoped for the sub-BWP corresponding to a frequency resource allocated for the corresponding transport block.

Alternatively, the frequency hopping configuration information may include configuration information for the plurality of subbands constituting the bandwidth part. That is, a plurality of consecutive and non-overlapping subbands constituting the bandwidth part may be configured. In this case, the UE may determine a frequency resource location to be hoped for the subband corresponding to a frequency resource allocated for the corresponding transport block.

The transmitter 1230 may be configured to transmit the transport block through the plurality of slots according to the frequency resource location. After determining the location of the frequency resource to be hopped, the transmitter 1230 may transmit the transport block to which the frequency hopping is applied at the location to the base station through an uplink control channel or an uplink data channel.

According to the embodiments described above, it is possible to perform the frequency hopping with scheduling rigidity eliminated and while transmitting a transport block using the plurality of slots.

Hereinafter, configurations of the base station capable of performing some or all of the embodiments described with reference to FIGS. 1 to 11 will be described with reference to the drawings.

Figure 13:
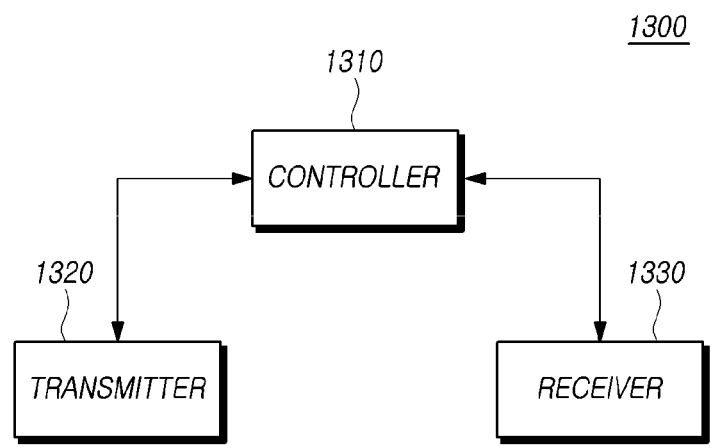
FIG. 13 is a block diagram illustrating a base station according to an embodiment.

FIG. 13 is a block diagram illustrating a base station 1300 according to an embodiment.

Referring to FIG. 13, a base station 1300 includes a controller 1310, a transmitter 1320, and a receiver 1330.

The controller 1310 controls the overall operation of the base station 1300 for performing a frequency to perform uplink transmission needed to perform the above-described disclosure. The transmitter 1320 and the receiver 1330 are used to transmit or receive signals or messages or data necessary for performing the above-described disclosure, with the UE.

The transmitter 1320 may be configured to transmit frequency hopping configuration information for a transport block transmitted using a plurality of slots. The transport block may be the transport block over multi-slot (TBoMS). That is, the transport block is transmitted using a plurality of slots. For the transport block transmitted using the plurality of slots, the number of coded bits applied to each slot is set to be same as the number of coded bits when transmitted using a single slot, and the transport block is coded according to a corresponding number of bits.

A plurality of slots for transmitting a transport block may be configured with consecutive or non-consecutive slots. In this way, the transmitter 1320 may transmit the frequency hopping configuration information defined separately for a transport block transmitted over a plurality of slots.

For example, the frequency hopping configuration information includes information on whether or not the frequency hopping is applied and frequency hopping offset information, and the frequency hopping configuration information may be received by higher layer signaling such as RRC signaling. In addition, the frequency hopping configuration information may further include information on whether or not the frequency hopping for the repeated transmission is applied, frequency hopping related information for the transport block to be transmitted using the plurality of slots, inter-slot frequency hopping related information, and the like. In this case, the frequency hopping related information for the transport block to be transmitted using the plurality of slots may include information on a slot location to which the frequency hopping may be applied or frequency hopping offset values.

The receiver 1330 may be configured to receive the transport block through the plurality of slots according to a determined frequency resource location to be hopped in the plurality of slots based on the frequency hopping configuration information.

As described above, configurations related to the frequency hopping for the transport block to be transmitted using the plurality of slots by the high layer signaling may be configured in advance. Thereafter, the base station may transmit a downlink control information (DCI) indicating whether to apply the frequency hopping and the frequency hopping offset from the base station. For example, a separate field for indicating the frequency hopping for the transport block to be transmitted using the plurality of slots may be further contained in the DCI. Alternatively, the DCI of a new format for the corresponding transport block may be newly defined.

The UE may determine the location of a frequency resource for the plurality of slots for transmitting the transport block based on the preconfigured frequency hopping configuration information according to information indicated by the DCI.

According to an embodiment, with respect to the plurality of slots allocated for transmitting one transport block, when the slots are consecutive, whether to apply the frequency hopping may be indicated based on the slot number in the radio frame of the allocated slot. Alternatively, odd-numbered or even-numbered slots within the plurality of slots allocated for the corresponding transport block may be indicated as the frequency hopping locations. Alternatively, when the plurality of slots allocated for transmission of one transport block are non-consecutive, a frequency hopping location or an offset value determined together when configuring the set of the plurality of slots may be indicated. Alternatively, all slots may be divided into the front half and the rear half (e.g., first half and second half), so that one of the entire front half and second half may be indicated as the frequency hopping location.

According to another embodiment, when the repeated transmission for the transport block is configured, the frequency hopping may be applied based on a slot unit configured for the repeated transmission. That is, when both TBoMS and the repeated transmission are applied, the UE may determine the location of the frequency hopped frequency resource in units of slots to be repeatedly transmitted. In other words, the frequency hopping may be applied based on the slot unit configured for the repeated transmission when the repeated transmission is configured for the transport block. For example, the UE may determine the location of the frequency resource so that the frequency hopping is applied only to one of a plurality of slots in which the corresponding transport block is initially transmitted or the plurality of slots in which the corresponding transport block is repeatedly transmitted.

According to an embodiment, the frequency hopping may be applied based on a bandwidth part (BWP) configured for the UE or a plurality of subbands constituting the bandwidth part. For example, the frequency hopping configuration information may include frequency hopping information based on the bandwidth part configured in the UE.

For example, the frequency hopping configuration information may include information configuring a plurality of sub-BWPs within the bandwidth part. In this case, when the transmitter 1320 may transmit the index information for the sub-BWP through the DCI, it may determine the frequency resource location to be hoped in the corresponding sub-BWP. Alternatively, the UE may determine the frequency resource location to be hoped for the sub-BWP corresponding to a frequency resource allocated for the corresponding transport block.

Alternatively, the frequency hopping configuration information may include configuration information for the plurality of subbands constituting the bandwidth part. That is, a plurality of consecutive and non-overlapping subbands constituting the bandwidth part may be configured. In this case, the UE may determine a frequency resource location to be hoped for the subband corresponding to a frequency resource allocated for the corresponding transport block.

The receiver 1330 may receive the transport block through the plurality of slots according to the frequency resource location. After determining the location of the frequency resource to be hopped, the receiver 1330 may receive the transport block to which the frequency hopping is applied at the location from the UE through an uplink control channel or an uplink data channel.

According to the embodiments described above, it is possible to perform the frequency hopping with scheduling rigidity eliminated and for transmitting a transport block using the plurality of slots.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment for frequency hopping to perform uplink transmission, the method comprising:
receiving frequency hopping configuration information for a single transport block over multi-slot (TBoMS) where a single transport block is transmitted using a plurality of slots;
determining a frequency resource location to be hopped in the plurality of slots assigned for transmitting the single transport block based on the frequency hopping configuration information; and
transmitting the single transport block through the plurality of assigned slots according to the frequency resource location,
wherein the transport block is one of a plurality of transport blocks constituting a Physical Uplink Shared Channel (PUSCH) to be transmitted.

2. The method according to claim 1, wherein the frequency hopping configuration information comprises information on frequency hopping offset information, and the frequency hopping configuration information is received by high layer signaling.

3. The method according to claim 1, wherein the frequency hopping is applied based on a configured slot unit in which repeated transmission is configured when the repeated transmission is configured for the transport block.

4. The method according to claim 1, wherein for the transport block, a number of coded bits applied to each slot is set to be same as a number of coded bits when transmitted using a single slot.

5. The method according to claim 1, wherein the frequency hopping is applied based on a bandwidth part (BWP) configured for the user equipment.

6. A method of a base station for frequency hopping to perform uplink reception, the method comprising:
transmitting frequency hopping configuration information for a single transport block over multi-slot (TBoMS) where a single transport block is transmitted using a plurality of slots; and
receiving the transport block through the plurality of slots assigned for transmitting the single transport block according to a determined frequency resource location to be hopped in the plurality of slots based on the frequency hopping configuration information,
wherein the transport block is one of a plurality of transport blocks constituting a Physical Uplink Shared Channel (PUSCH) to be transmitted.

7. The method according to claim 6, wherein the frequency hopping configuration information comprises information on frequency hopping offset information, and the frequency hopping configuration information is received by high layer signaling.

8. The method according to claim 6, wherein the frequency hopping is applied based on the configured slot unit in which repeated transmission is configured when the repeated transmission is configured for the transport block.

9. The method according to claim 6, wherein for the transport block, a number of coded bits applied to each of the plurality of slots is set to be same as a number of coded bits when transmitted using a single slot.

10. The method according to claim 6, wherein the frequency hopping is applied based on a bandwidth part (BWP) configured for the user equipment.

11. A user equipment of performing frequency hopping for uplink transmission, the user equipment comprising:
- a receiver configured to receive frequency hopping configuration information for a single transport block over multi-slot (TBoMS) where a single transport block is transmitted using a plurality of slots;
- a controller configured to determine a frequency resource location to be hopped in the plurality of slots assigned for transmitting the single transport block based on the frequency hopping configuration information; and
- a transmitter configured to transmit the single transport block through the plurality of slots according to the frequency resource location,
- wherein the transport block is one of a plurality of transport blocks constituting a Physical Uplink Shared Channel (PUSCH) to be transmitted.

12. The user equipment according to claim 11, wherein the frequency hopping configuration information comprises information on frequency hopping offset information, and the frequency hopping configuration information is received by high layer signaling.

13. The user equipment according to claim 11, wherein the frequency hopping is applied based on the configured slot unit in which repeated transmission is configured when the repeated transmission is configured for the transport block.

14. The user equipment according to claim 11, wherein for the transport block, a number of coded bits applied to each of the plurality of slots is set to be same as a number of coded bits when transmitted using a single slot.

15. The user equipment according to claim 11, wherein the frequency hopping is applied based on a bandwidth part (BWP) configured for the user equipment.

* * * * *